United States Patent [19]

DeBeradinis

[11] Patent Number: 4,688,762

[45] Date of Patent: Aug. 25, 1987

[54] METHOD FOR LUBRICATING ELECTRICAL WIRING PULLED THROUGH INSTALLED CONDUIT

[76] Inventor: Donald L. DeBeradinis, 137 Eden Rd., Stamford, Conn. 06907

[21] Appl. No.: 878,614

[22] Filed: Jun. 26, 1986

[51] Int. Cl.$^4$ ............................................. B65H 59/00
[52] U.S. Cl. ........................................... 254/134.3 FT
[58] Field of Search .............. 254/134.3 FT, 134.3 R; 184/15.1; 15/104.35 N, 210 B; 175/209–211; 185/121, 127

[56] References Cited

U.S. PATENT DOCUMENTS

| | | | |
|---|---|---|---|
| 2,095,914 | 10/1937 | Brown | 285/121 |
| 2,490,328 | 12/1949 | Van Fleet | 285/121 |
| 3,605,947 | 9/1971 | Salerno et al. | 184/15.1 |
| 4,063,617 | 12/1977 | Shenk | 184/15.1 |
| 4,331,322 | 5/1982 | Woodruff | 184/15.1 |
| 4,412,673 | 11/1983 | Ramsden et al. | 254/134.3 FT |
| 4,508,371 | 4/1985 | Maier | 285/127 |

FOREIGN PATENT DOCUMENTS 1024298  2/1958  Fed. Rep. of Germany ..... 184/15.1

*Primary Examiner*—Robert C. Watson
*Attorney, Agent, or Firm*—Parmelee, Bollinger & Bramblett

[57] ABSTRACT

An installed electrical conduit is formed from a plurality of lengths of hollow conduit which are joined together by installing a plurality of conduit couplings having removably covered access ports spaced along the installed conduit through which the insulated electrical wires are to be pulled. The covered access ports are opened and lubricant is injected through these access ports at spaced intervals along the installed conduit. The electrical wiring is pulled through the lubricated conduit. The open access ports also allow the observance of the progress of the wire pulling; after the pulling operation is completed the access ports are closed. The ported couplings are preferably located in front of bends with respect to the intended direction of pulling to thereby provide lubricating points preceeding the bends around which the wires are to be pulled to facilitate the pulling operation. The access ports thus provide portals for injecting lubricant and enable visual assessment of the conduit interior as well as observing pulling progress. In those instances where a pair of metal "snakes" are slid into the installed conduit from both ends of the conduit, the access openings provide means for facilitating hooking together the inner ends of the shakes which are then used to pull insulated wires through the conduit. The method and apparatus described can be applied using different types of conduit such as metal tubing, threaded metal pipes or plastic conduit.

3 Claims, 6 Drawing Figures

METHOD FOR LUBRICATING ELECTRICAL WIRING PULLED THROUGH INSTALLED CONDUIT

FIELD OF THE INVENTION

This invention relates to a method and apparatus for lubricating electrical wiring pulled through installed conduit and more particularly, to links of conduit intercoupled with conduit couplings having covered access ports spaced along the conduit which are utilized in the method for providing lubrication entrances as well as giving access to the inside of the installed conduit.

BACKGROUND

In a typical wire-through-conduit pulling operation, one electrician feeds insulated electrical wires into a first end of an installed conduit, while another electrician pulls on the same sires from the second end of the same conduit using pulling means, for example a rope, dragline or snaking device which is attached to the leading ends of the electrical wires being pulled through the conduit. In order to facilitate the pulling of the electrical wiring through the conduit, conventional procedure involves applying a generous amount of electrical wire-pulling lubricant onto the wiring as it is being pulled into the first end of the conduit by the pulling means. Thus, one electrician is applying lubricant and pushing the wire into a first end of the conduit while the other person is pulling on the line or snaking device at the second end. This existing, well-known, conventional technique has severe disadvantages in that the lubricant is scraped off from the insulated wires as they are being pulled through a long conduit or around bends in the conduit. Consequently, frictional forces can increase to undesirably high levels or even to the point where the wires become stuck in the conduit. Also, the cumulative frictional forces produce heat which dries up the electrical wire lubricant and accordingly, reduces its intended lubricity. In addition, in the attempt to apply plenty of lubricant for a long pull, the installer is applying gobs of the lubricant onto the entering wires often causing a mess both on the installer's clothes and hands and on the floor and walls nearby. Since the installer is normally attempting to push the entering wires to help their travel through the conduit, the application of the lubricant to the wires makes handling of the electrical wires difficult and extremely messy. Lubricant makes the installer's hands slide awkwardly.

The conventional handling of electrical lubricant is so messy, and awkward that installers become inclined sometimes to omit use of the lubricant for "short length" pulling operations. Lack of lubricant subjects electrical insulation on the pulled wires to detrimental or damaging abrasion.

Often, a mechanical pulling device is applied to the end of the snake or line being used to pull the electrical wires through the installed conduit. When the wires become stuck the resulting tension forces can become so great that the fastener on the inner end of the snake or line becomes detached from the stuck wires. The taut pulling line or snake then snaps out of the conduit at high velocity with explosive-like effect. Serious injuries to electricians have occassionally occurred when a mechanically-driven pulling line under large tension force suddenly detached from stuck wires inside of a conduit. Also, large friction forces around bends inside the conduit can damage or rupture the insulation covering on the electrical wires being pulled through the conduit, causing an unknown hazardous electrical defect to be created.

In summary, the conventional wire-through-conduit pulling technique is sometimes ineffective, always awkward, often messy, and sometimes causes unseen defects by abrasion or rupture of insulation coatings and has been known to cause serious injuries when mechanical pulling devices are opposed by stuck wires.

SUMMARY OF THE INVENTION

Accordingly, it is an object of this invention to provide new and improved method and apparatus for lubricating electrical wiring pulled through installed conduit which are more convenient and less messy, less expensive and safer than former methods.

A further object of this invention is to provide a new and improved method and apparatus for facilitating the pulling of electrical wiring through installed conduit which eliminates the mess caused by applying ample amounts of lubricant to the insulated electrical wires as they enter the conduit.

Still a further object of this invention is to provide a new and improved method and apparatus for lubricating electrical wiring pulled through installed conduit which facilitates pulling the wires by enabling lubrication of the electrical wires to be achieved prior to their travel around a bend in the installed conduit.

Another object of this invention is to provide a new and improved method and apparatus for facilitating the pulling of electrical wiring through installed conduit and permitting mechanical and visual access to the interior of the conduit while a snake or snakes are initially being slid through the installed conduit and also as the wiring is being pulled therethrough.

In carrying out this invention in one illustrative embodiment thereof, the method of lubricating electrical wiring pulled through installed conduit comprises the steps of forming the conduit from a plurality of links or hollow conduit and installing a plurality of conduit couplings having covered access ports therein spaced along the conduit and intercoupling the plurality of links. The covered access ports are opened along the conduit and lubricant is injected at spaced intervals along the conduit through the opened access ports, and then the electrical wiring is pulled through the conduit with the open ports providing a means of observing the progress of the wire pulling operation. The access ports are then closed after the wire has been pulled through the conduit. Preferably, the ported couplings are located in front of the bends in the conduit with respect to the direction the wire is inted to be pulled therethrough. In addition, if pairs of snaking lines for the wires to be pulled are inserted from opposite ends of the conduit, the open ports may be utilized to facilitate hooking together the inner ends of the snakes inserted from opposite ends of the conduit to form one continuous snake to be used for the wire pulling operation.

Accordingly, the conduit may be lubricated by injecting lubricant through the ports at spaced intervals along the installed conduit avoiding the problem of lubricating the wire as it is being pushed into one end of the conduit and avoiding the mess involved. In addition, the installer has a visual capability for observing the electrical wires as they are being installed in long runs of conduit. By placing the couplings before sharp bends in the conduit and by injecting lubrication onto the wires before they pass through the bends, the wire pulling operation is facilitated and the likelihood of abrasion or rupture of the insulation on the wires is minimized. Frictional forces and frictional heating of the pulled wires are advantageously reduced.

BRIEF DESCRIPTION OF THE DRAWINGS

The invention together with further aspects, objects, features and advantages thereof will be more clearly understood from the following description considered in conjunction with the accompanying drawings which are not drawn to scale but are arranged for clarity of illustration.

FIG. 1 will be referred to in describing the method and apparatus for lubricating electrical wiring pulled through installed conduit in accordance with the present invention.

DESCRIPTION OF THE PREFERRED EMBODIMENTS

Figure 1:
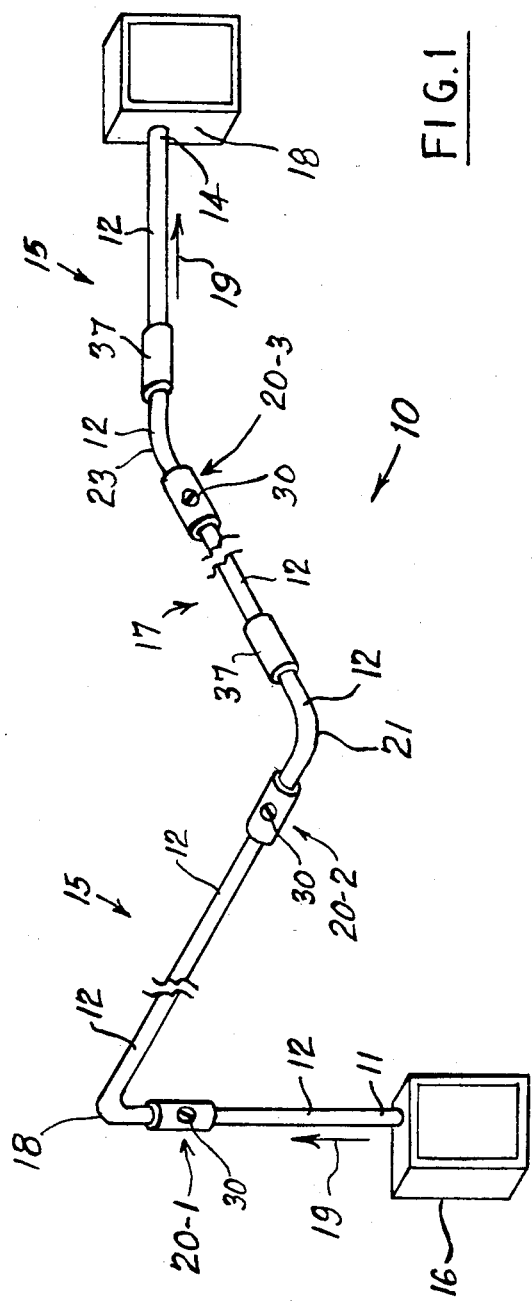
FIG. 1 illustrates a plurality of conduit couplings having removably covered access ports spaced along an installed conduit through which electrical wiring is to be pulled between separated panel or junction boxes.

Electrical conduits which carry electrical wiring extend from panel boxes to the points of usage. There often are junction boxes located at spaced positions along an installed conduit. The conduit protects the insulated electrical wiring and provides a guide for stringing the wiring through walls of buildings. The average "run" of an installed conduit is approximately 30 to 100 feet, more or less, depending upon the number of bends involved and whether the bends are relatively gradual or relatively sharp and depending upon convenient location of junction boxes in the building, and the standard length of a section 12 of tubular conduit is approximately 10 feet. The sections 12 (FIG. 1) of conduit are interconnected in the installed conduit 10 by means of couplings 20 generally made of the same type of material as the sections of the conduit. The conduit may be of relatively thick-walled metal pipe or relatively thinner-walled tubing or tubes of tough, stiffly bendable plastic. When insulated electrical wiring is pulled through a "run" of installed conduit 10, the electrical wiring is fed into a first end 11 of the installed conduit with the run generally starting at a panel box or juction box 16 and is pulled out of the second end 14 of the same conduit by a rope or drag line or snaking device which has been attached to the electrical wiring prior to its insertion into the first end 11 of the conduit 10. Prior to pulling through an installed conduit 10 the wire usually has been lubricated with electrical wire-pulling lubricant to ease the job of pulling the wire through the conduit as has been described in the Background section above.

Examples of such wire-pulling lubricants are "Aqua-Gel" water-based, soluble polymer type lubricant, "Yellow 77" wax-based type lubricant, and "Wire-Lube" soap based type lubricant which are commercially available from Ideal Industries, Inc. of Sycamore, Ill. These different types of lubricants are used with electrical wires having different types of insulating jackets, in accordance with published specifications known to electrical installation crews.

As has been described above, the conventional currently used technique is a messy, time-consuming operation with the lubricant becoming scraped off or friction-heated-dried quickly in long conduit runs. The present invention solves these problems by injecting lubrication along the run 10 through ported couplings 20 which are used to join the various sections 12 of the installed conduit 10, said ported couplings 20 being arranged in predetermined relationship to the direction 19 of the intended pull as well as with respect to the bends 18, 21 and 23 in the conduit through which the insulated electrical wires are to be pulled.

Referring again to FIG. 1, an installed conduit, generally referred to by the reference numeral 10, comprises a plurality of conduit sections 12 which are coupled together by a plurality of ported conduit couplings 20. The installed conduit 10 stretches between successive panel boxes or junction boxes 16 and 18. It is to be appreciated that this illustration is not drawn to scale and is arranged for clarity of illustration of the invention. As pointed out, the average conduit section 12 has a length of 10 feet, while the installed conduit run 10 is considerably longer. Also, the installed conduit 10 may stretch from a single panel box or junction box 16 to another junction box or power box or panel box 18 rather than being terminated as is illustrated in FIG. 1.

In one aspect of the present invention novel ported couplings 20 are used to assemble the installed conduit 10, such as those ported couplings shown in FIGS. 2–6 which are utilized in predetermined locations in the installed conduit 10 in a predetermined manner which will be described.

Figure 2:
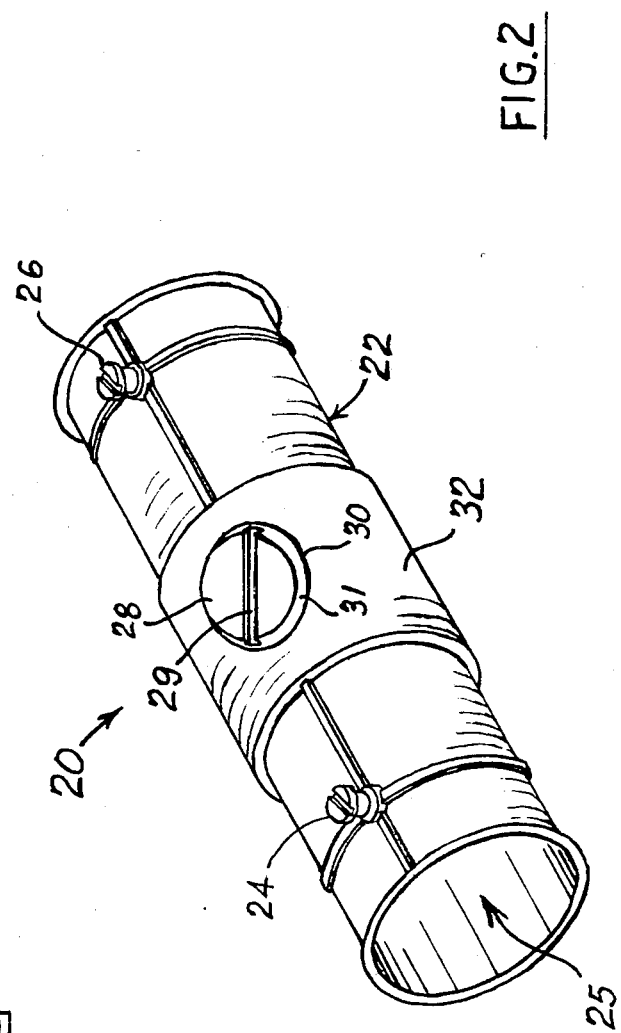
FIG. 2 is a perspective view of one form of ported conduit coupling having a covered access port which may be used in the present invention.

Referring to FIG. 2, the ported conduit coupler 20 has a generally hollow cylindrical body 22 with the joined conduit sections 12 being inserted into a socket 25 in each end thereof and being secured therein by suitable fastening means, for example such as set screws 24 and 26. Centrally positioned in the coupler 20 is a relatively large removable screw cover plug 28 set in a port 30 located in the mid-body 32 of the coupler 20. When the cover plug is removed from port 30, this port provides access to the interior of the installed conduit 10. The covered access ports 30 provide means for lubricating as well as for visually observing the wire pulling progress through the conduit 10 as well as access for manipulating, locating and hooking together the inner ends of snakes.

The access ports 30 (FIG. 2) which have just been described are illustrated at 30 in FIG. 1 and provide means for introducing by injecting lubrication for wiring as it is being pulled through the conduit 10 along the travel of the pulled electrical wires. The first ported coupler 20-1 in FIG. 1 is conveniently located for example, approximately 10 feet from the input end 11 of the wire-pulling run. The ported couplers 20-1, 20-2, and 20-3 are provided wherever desired along the total length of the installed conduit 10. Conventional non-ported couplers 37 may also be used in non-critical locations, namely for joing a straight run 15 or 17 of several conduit sections 12. The critical locations are in front of, i.e., preceding, bends 17, 21 and 23 and particularly relatively sharp bends, depending upon their curvature and the number of bends which occur in the installed conduit 10. As is illustrated in FIG. 1, a relatively sharp bend 17 occurs in the installed conduit and accordingly, a coupler 20-1 with its access port 30 is located in front of the bend 17 in the direction in which the wire is to be pulled as indicated by the arrow 19 so that the electrical wiring is lubricated prior to passing through bend 17 making it easier for the electrical wiring to navigate the bend 17 in the pulling operation with less friction and abrasion than usually. Likewise, another coupler 20-2 with its access port 30 is positioned before the bend 21, and another ported coupler 2-3 is located before a subsequent bend 23.

On the other hand, the reverse arrangment would be true were the wiring intended to be pulled in the reverse direction, namely from the second conduit end 14 toward the first conduit end 11. In such an arrangement the ported couplers 20-3, 20-2 and 20-1 would be positioned on the opposite sides of the respective bends 23, 21 and 17 from their locations in FIG. 1.

In other words, the preferred installation arrangement is for the ported couplers 30 to be located in front of the respective bends in the installed conduit in the direction in which wiring is to be pulled through the conduit. The access ports 30 also provide sight holes for watching the progress of the pulling operation.

As seen in FIG. 2, the mid-body 32 of the ported coupler 20 has a thicker wall than the two end portions of the hollow cylindrical body 22 for accommodating the screw threaded port 30. It is to be understood that it is conventional to use fastener means, such as the locking screws 24 and 26, for securing the ends of conduit sections 12 in the sockets 25.

The removable port cover 28 may include a screw driver slot 29 or other tool-engaging means, and its perimeter 31 may be knurled for facilitating manual gripping.

The type of lubricant utilized will depend on the type of insulation utilized on the electrical wiring which is to be pulled through the conduit as was explained above. In accordance with the invention, the introduction of the lubricant through the access ports 30 along the installed conduit may be done utilizing a lubricating gun or by hand by inserting the snout of a squeezable lubricant container into the port 30 thus neatly avoiding the mess generally involved when the lubricant is applied to the cable or electrical wiring as it is being pushed into the first end of the installed conduit.

Figure 3:
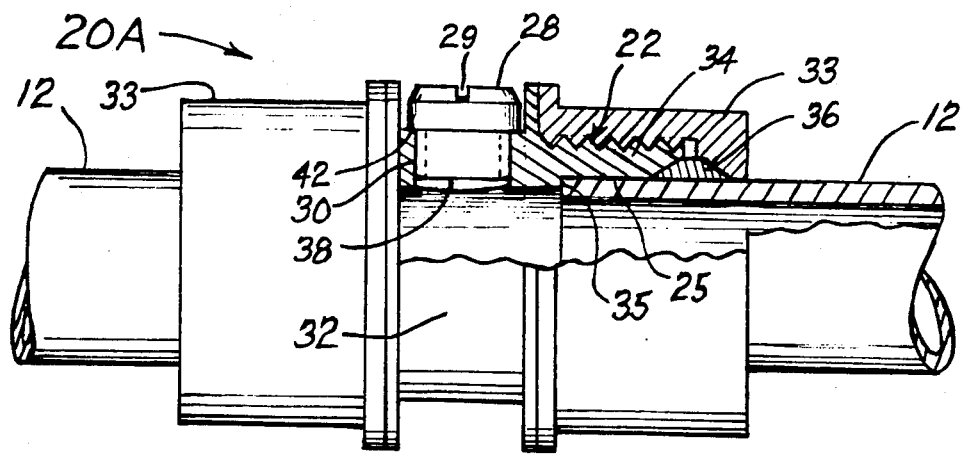
FIG. 3 illustrates another form of ported coupling which may be utilized in the present invention, being shown partially broken away in section.

In FIG. 3 a compression-fitting type of coupler, referred to generally by the reference numeral 20A has a generally hollow cylindrical body 22, and an attachment hex nut 33 is screwed onto a threaded hollow end portion 34 of the coupler 20A with a conduit tubing section 12 being inserted into the socket 25 in the end portion 34 to abut against an internal shoulder 35. A removable cover plug 28 is screwed into a central port 30 in the coupler 20A for providing access to the interior of the installed conduit 10 (FIG. 1). A compression-type retaining ring 36 firmly secures the conduit section 12 in the socket 25 when the nut 33 is screwed tightly onto stud 34 for compressing the ring 35.

Figure 4:
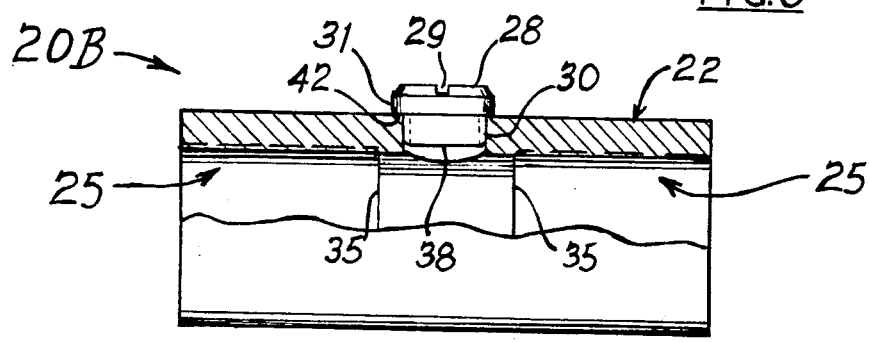
FIG. 4 is a partial axial sectional and elevational view of a threaded pipe type coupling which may be employed in the present invention.

FIG. 4 illustrates a threaded-pipe type of the ported coupler 20B which has internally threaded sockets 25 into which conduit pipe lengths 12 are screwed from either end thereof for intercoupling them. A removable cover plug 28 in a central port opening 28 in the hollow cylindrical body 22 provides a covered access port for the installed conduit 10. It is to be noted that in its fully tightened position the bottom 38 of the port covering plug 28 does not extend into the conduit interior nor in any way obstruct the passageway through the installed conduit 10. This port cover plug 28 having a lower end 38 which is arranged not to obstruct the conduit passageway is also provided in each of the ported coupling embodiments 20, 20A, 20B and 20C, because the plug 28 in the access port 30 should not in any way interfere or obstruct the wire-pulling operation as the wire passes through the conduit passageway through the coupling embodiment.

Figure 5:
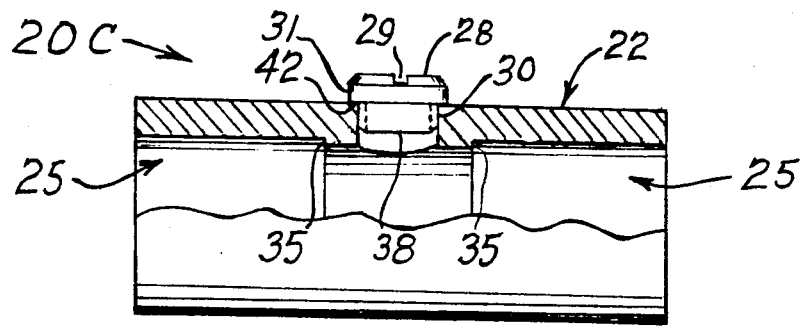
FIG. 5 is a partial axial sectional view and elevational view of a ported plastic coupling which may be utilized in carrying out the present invention.

FIG. 5 illustrates a ported plastic coupler 20C with smooth bore end sockets 25 having internal restricting shoulders 35 and having a central port 30 into which a removable cover plug 28 is screwed. In this, as in other embodiments, the cover screw plug has a flange 42 to prevent the penetration of the screw bottom 38 into the conduit passageway.

In using this ported plastic coupler 20C sections 12 of tough, strong, durable stiffly flexible conduit, for example made of polyvinyl chloride, are inserted into the smooth bore sockets 25 coated with plastic pipe cement for providing the fastening means in the sockets 25. The cement quickly sets for providing a strong connection between such conduit sections. The body 22 of the coupler 20C is made of plastic material similar to that from which the inserted conduit sections are formed.

Figure 6:
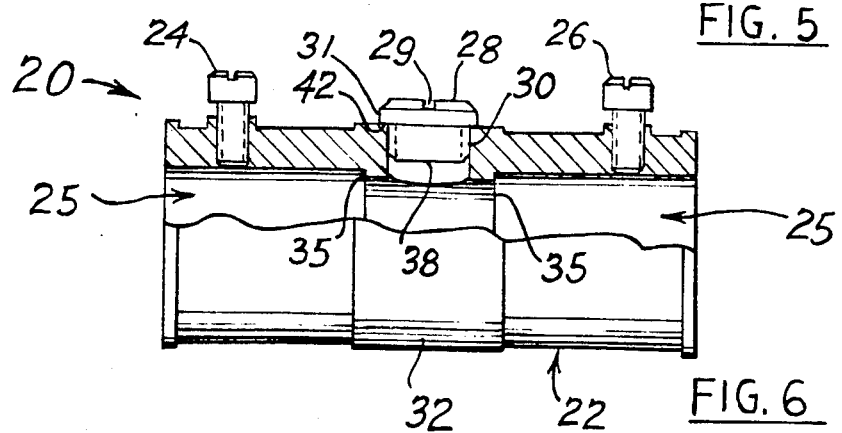
FIG. 6 is a partial axial sectional and elevational view of still another ported coupling similar to the ported coupling shown in FIG. 2 which may be utilized in the present invention.

FIG. 6 shows the ported coupler embodiment 20 of FIG. 2 having the removable screw plug 28 positioned in the central port 30 in the hollow, cylindrical metallic casing 22 which carries set screws 24 and 26 for holding conduit sections 12 inserted in opposite end sockets 25 thereof. Central shoulders 35 are provided for positioning the opposite entering conduit sections inserted into the coupler 20.

It is to be understood that any of the couplers 20, 20A, 20B or 20C may be used at the locations 20-1, 20-2 and 20-3 in FIG. 1 providing that the particular type of couplers is compatible with the particular type of conduit sections 12.

Accordingly, conventional conduit coupling devices are replaced with ported conduit couplings 20, 20A, 20B and 20C having access ports 30 with screw-in cover plugs 28 which are removable by screwdrivers or other tools or manually. The ports 30 when the covers 28 have been removed, enable lubricant to be injected at spaced locations along the installed conduit 10. These couplers are located at strategic points along the installed conduit, for example, ahead of each significant bend 17, 21, 23 to insure the lubricating and smooth passage of the pulled electrical wiring around such bends as well as over relatively long pulling runs. In addition, these access ports 30 enable the electrician to observe the progress of the pulled wires as they are being drawn by a snake or pulling line through the installed conduit 10. In those cases where two snakes are initially inserted from opposite ends of the installed conduit and are then hooked together near the middle of the conduit, the access ports 30 facilitate the task of locating and then of inter-engaging the ends of the two snakes within the conduit for fastening them together so as to form one continuous snake through the whole conduit from end-to-end. At present such hooking is done by blind feel and by listening and attempting to hear when the ends of the two snakes meet each other inside of the conduit. With such strategically placed access port couplers 20-1, 20-2 and 20-3 in accordance with the present invention, the difficulty of connecting such snaking devices is alleviated. Being able to lubricate at strategically placed points along the electrical wiring pull eliminates a great deal of the difficulty previously encountered in pulling electrical wiring through conduits.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. The method of lubricating electrical wiring as the wiring is being pulled through installed conduit comprising the steps of:
    providing a plurality of hollow conduit lengths,
    providing a plurality of conduit couplings,
    interconnecting the adjacent ends of successive ones of said conduit lengths by respective conduit couplings for forman installed electrical conduit having a first end and a second end,
    a plurality of said couplings being ported couplings each having an access port with a removable cover, said access port being located in the central portion of the coupling,
    said ported couplings being spaced along the installed conduit into which the wire is to be pulled,
    removing the covers from said access ports in said ported couplings along said installed conduit when said wire is to be installed,
    using said uncovered access ports to facilitate inserting snaking means through said installed conduit from one of said ends to the other,
    attaching the electrical wiring to said snaking means near said first end of the installed conduit, and
    injecting wire-pulling lubricant into the installed conduit through said uncovered access ports located at spaced intervals along the installed conduit,
    pulling the electrical wiring by said snaking means through said lubricated installed conduit from said first end to said second end,
    observing through said uncovered access ports the progress of the electrical wiring as the wiring is being pulled through said installed conduit, and
    covering said uncovered access ports after the electrical wiring has been pulled through said conduit.

2. The method as claimed in claim 1, wherein the installed conduit includes bends, including the further steps of:
    positioning said ported couplings near respective bends in said installed conduit in front of said bends with respect to the intended pulling direction from said first end to said second end, and
    injecting wire-pulling lubricant through said uncovered access ports in said ported couplings in front of the respective bends onto the electrical wiring within the installed conduit before the electrical wiring is pulled around the respective bends.

3. The method as claimed in claim 1, wherein said snaking means include two snaking lines, including the further steps of:
    inserting a first of said two snaking lines into the installed conduit through said first end of the installed conduit,
    inserting the second of said two snaking lines into the installed conduit through said second end of the installed conduit,
    observing the progress of said first and second snaking lines through uncovered access ports, and
    using at least one of said uncovered access ports for facilitating connecting said first and second snaking lines together within said installed conduit for forming a continuous snaking means extending through said installed conduit from said first end to said second end.

* * * * *